United States Patent
Garde et al.

(10) Patent No.: US 10,736,141 B2
(45) Date of Patent: Aug. 4, 2020

(54) ADAPTING RTS-CTS PROTECTION IN A WLAN

(71) Applicant: ARRIS Enterprises LLC, Suwanee, GA (US)

(72) Inventors: Sidharth Ravindra Garde, Sunnyvale, CA (US); Sanjay Kishore Katabathuni, Fremont, CA (US); Susinder Rajan Gulasekaran, San Jose, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 16/191,114

(22) Filed: Nov. 14, 2018

(65) Prior Publication Data

US 2019/0159254 A1    May 23, 2019

Related U.S. Application Data

(60) Provisional application No. 62/586,065, filed on Nov. 14, 2017.

(51) Int. Cl.
*H04W 74/08* (2009.01)
*H04W 24/02* (2009.01)
*H04W 84/12* (2009.01)

(52) U.S. Cl.
CPC ....... *H04W 74/0808* (2013.01); *H04W 24/02* (2013.01); *H04W 74/0816* (2013.01); *H04W 84/12* (2013.01)

(58) Field of Classification Search
CPC ........... H04W 74/0816; H04W 74/006; H04W 74/08; H04W 74/00; H04W 84/12; H04W 74/0808; H04W 24/02
See application file for complete search history.

(56) References Cited

U.S. PATENT DOCUMENTS

| | | | | |
|---|---|---|---|---|
| 6,470,357 B1 * | 10/2002 | Garcia, Jr. | ........ | H04L 29/12009 |
| 2006/0239293 A1 * | 10/2006 | Vasil'evich | .......... | H04L 1/0002 370/445 |

(Continued)

OTHER PUBLICATIONS

PCT International Search Report & Written Opinion, RE: Application No. PCT/US2018/061087, dated Feb. 28, 2019.

*Primary Examiner* — Brenda H Pham
(74) *Attorney, Agent, or Firm* — Steven Stupp; Stewart Wiener

(57) ABSTRACT

An electronic device that dynamically adapts RTS-CTS protection is described. During operation, this electronic device may obtain communication parameters associated with communication in a WLAN, which includes the electronic device and a second electronic device. For example, the communication parameters may include a collision probability, a PPDU airtime, an RTS airtime, a SIFS airtime and/or a CTS airtime. Then, the electronic device may determine an RTS-CTS performance metric based at least in part on the communication parameters. For example, the RTS-CTS performance metric may be based at least in part on the collision probability, the RTS airtime, the SIFS airtime, and/or the CTS airtime. Next, the electronic device may compare the RTS-CTS performance metric and the PPDU airtime. Moreover, based at least in part on the comparison, the electronic device may selectively use RTS-CTS protection during communication of a PPDU with the second electronic device.

20 Claims, 10 Drawing Sheets

(56) References Cited

U.S. PATENT DOCUMENTS

2007/0280187 A1* 12/2007 Wang ................. H04L 63/1416
370/338
2017/0064741 A1* 3/2017 Zhou ................... H04W 74/006

* cited by examiner

ADAPTING RTS-CTS PROTECTION IN A WLAN

CROSS REFERENCE TO RELATED APPLICATIONS

This application claims priority under 35 U.S.C. 119(e) to U.S. Provisional Application Ser. No. 62/586,065, entitled "Method to Adapt RTS-CTS Protection in WLAN Devices," by Sidharth Ravindra Garde, Sanjay Kishore Katabathuni and Susinder Rajan Gulasekaran, filed on Nov. 14, 2017, the contents of which are herein incorporated by reference.

BACKGROUND

Field

The described embodiments relate to techniques for dynamically adapting RTS-CTS protection in a wireless local area network (WLAN).

Related Art

Many electronic devices are capable of wirelessly communicating with other electronic devices. For example, these electronic devices can include a networking subsystem that implements a network interface for: a cellular network (UMTS, LTE, etc.), a wireless local area network, e.g., a wireless network such as described in the Institute of Electrical and Electronics Engineers (IEEE) 802.11 standard (which is sometimes referred to as 'Wi-Fi', from the Wi-Fi Alliance of Austin, Tex.), Bluetooth™ (from the Bluetooth Special Interest Group of Kirkland, Wash.), and/or another type of wireless network.

During Wi-Fi communication, electronic devices that have packets or frames to transmit may use a Carrier Sense Multiple Access-Collision Avoidance (CSMA-CA) protocol (as specified in IEEE 802.11 standards) in order to fairly access a shared medium. However, as the number of electronic devices in a WLAN increases, there may be significant wasted airtime because of collisions. This problem may be exacerbated by long physical layer convergence protocol (PLCP) protocol data unit (PPDU) transmissions.

Consequently, IEEE 802.11 standards provide an option for electronic devices to employ ready to send (RTS)-clear to send (CTS) protection, which can reduce wasted airtime associated with collisions at the cost of increased overhead. In general, RTS-CTS protection offers communication-performance benefits in some environments, while degrading the communication performance in others. For example, in some scenarios, the overhead associated with RTS-CTS protection may be larger than the airtime loss because of collisions.

SUMMARY

An electronic device that dynamically adapts RTS-CTS protection is described. This electronic device may include an antenna and an interface circuit that wirelessly communicates with a second electronic device. During operation, the electronic device may obtain communication parameters associated with communication in a WLAN, which includes the electronic device and the second electronic device. For example, the communication parameters may include a collision probability, a PPDU airtime, an RTS airtime, a SIFS airtime and/or a CTS airtime.

Then, the electronic device may determine an RTS-CTS performance metric based at least in part on the communication parameters. For example, the RTS-CTS performance metric may be based at least in part on the collision probability, the RTS airtime, the SIFS airtime, and/or the CTS airtime.

Next, the electronic device may compare the RTS-CTS performance metric and the PPDU airtime. Moreover, based at least in part on the comparison, the electronic device may selectively use RTS-CTS protection during communication of a PPDU with the second electronic device. For example, if the PPDU airtime is greater than or equal to the RTS-CTS performance metric, the electronic device may use the RTS-CTS protection during the communication of the PPDU with the second electronic device. Alternatively, if the PPDU airtime is less than the RTS-CTS performance metric, the electronic device may not use the RTS-CTS protection during the communication of the PPDU with the second electronic device.

Moreover, the electronic device may estimate the collision probability indirectly. For example, the collision probability may be computed based at least in part on a number of electronic devices contending for a shared medium in the WLAN, a type of traffic, traffic flows and/or a communication direction. Alternatively, the electronic device may determine the collision probability using a look-up table that includes predetermined or precalculated collision probabilities.

In some embodiments, the electronic device is an access point. The electronic device may compute or look-up the collision probability based at least in part on: a number of electronic devices that are associated with the access point, how many of the associated electronic devices have active traffic flows to be sent in a downlink communication direction, a traffic type and/or a number of traffic flows in the downlink and uplink communication directions during a time interval. For example, the access point may monitor the number of traffic flows.

Alternatively, the electronic device may be a client in the WLAN. In these embodiments, the electronic device may estimate the collision probability based at least in part on a number of RTS and/or acknowledgment timeouts and a number of transmission attempts by the electronic device.

Another embodiment provides a computer-readable storage medium for use with the electronic device. This computer-readable storage medium may include program instructions that, when executed by the electronic device, cause the electronic device to perform at least some of the aforementioned operations.

Another embodiment provides a method for dynamically adjusting RTS-CTS protection. This method includes at least some of the operations performed by the electronic device.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An electronic device that dynamically adapts RTS-CTS protection is described. During operation, this electronic device may obtain communication parameters associated with communication in a WLAN, which includes the electronic device and a second electronic device. For example, the communication parameters may include a collision probability, a PPDU airtime, an RTS airtime, a SIFS airtime and/or a CTS airtime. Then, the electronic device may determine an RTS-CTS performance metric based at least in part on the communication parameters. For example, the RTS-CTS performance metric may be based at least in part on the collision probability, the RTS airtime, the SIFS airtime, and/or the CTS airtime. Next, the electronic device may compare the RTS-CTS performance metric and the PPDU airtime. Moreover, based at least in part on the comparison, the electronic device may selectively use RTS-CTS protection during communication of a PPDU with the second electronic device.

By dynamically adjusting the RTS-CTS protection, this communication technique may improve the communication performance of the electronic device. For example, the communication technique may ensure collisions are averted when the electronic device is accessing a shared medium in the WLAN when needed, without incurring unnecessary overhead associated with the RTS-CTS protection when it is not needed. Consequently, the communication technique may improve the user experience, and thus may improve customer satisfaction and retention.

In the discussion that follows, the electronic device may include a portable electronic device (such as a cellular telephone) or an access point that communicates frames or packets in accordance with a wireless communication protocol, such as an Institute of Electrical and Electronics Engineers (IEEE) 802.11 standard, Bluetooth, and/or another type of wireless interface. In the discussion that follows, Wi-Fi is used as an illustrative example. However, a wide variety of communication protocols may be used, such as Long Term Evolution or LTE (from the 3rd Generation Partnership Project of Sophia Antipolis, Valbonne, France), LTE Advanced (or LTE-A), a third generation or 3G communication protocol, a fourth generation or 4G communication protocol, a fifth generation or 5G communication protocol, or other present or future developed advanced cellular communication protocol, etc.

Moreover, the access point may communicate with other access points and/or computers in a network using a wired communication protocol, such as an IEEE 802.3 standard (which is sometimes referred to as 'Ethernet') and/or another type of wired interface. In the discussion that follows, Ethernet is used as an illustrative example.

Figure 1:
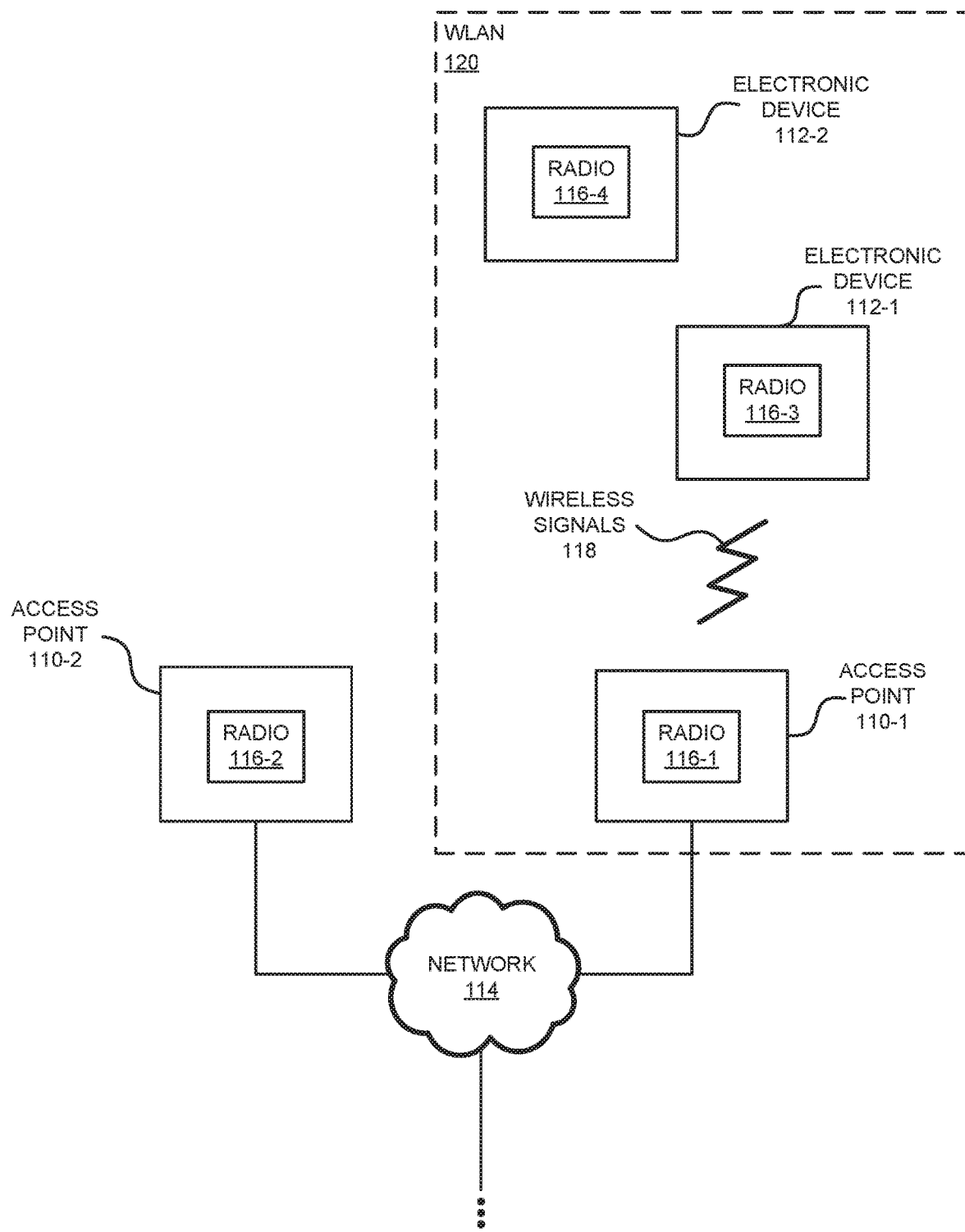
FIG. 1 is a block diagram illustrating an example of a system in accordance with an embodiment of the present disclosure.

FIG. 1 presents a block diagram illustrating an example of communication among one or more access points 110 and one or more electronic devices 112 (such as a cellular telephone) in accordance with some embodiments. Notably, access points 110 may communicate with each other using wireless and/or wired communication. Note that access points 110 may include a physical access point and/or a virtual access point that is implemented in software in an environment of an electronic device or a computer. In addition, access points 110 may communicate with electronic devices 112 using wireless communication.

The wired communication among access points 110 may occur via network 114 (such as an intra-net, a mesh network, point-to-point connections and/or the Internet) and may use a network communication protocol, such as Ethernet. Moreover, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, wireless communication among access points 110 also involves the use of dedicated connections, such as via a peer-to-peer (P2P) communication technique.

Figure 10:
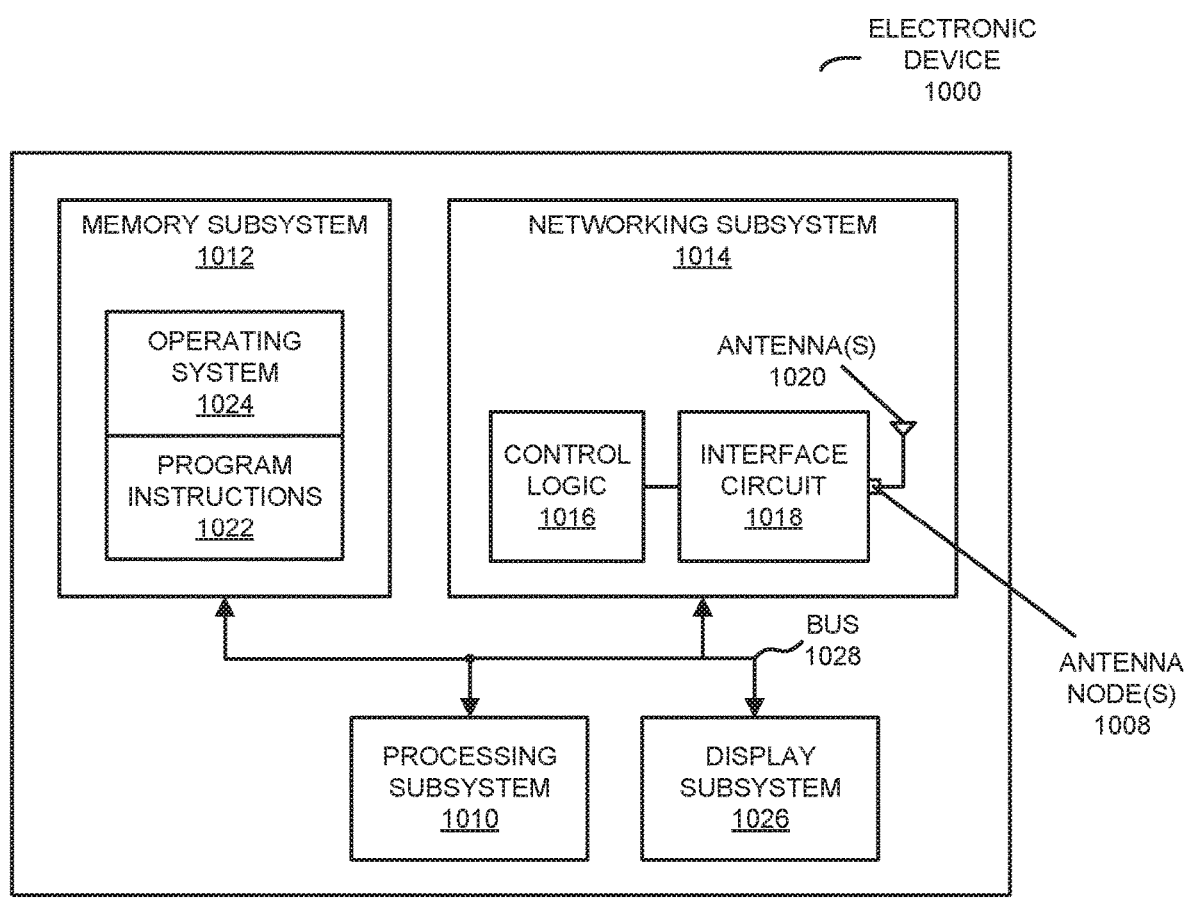
FIG. 10 is a block diagram illustrating an example of an electronic device in accordance with an embodiment of the present disclosure.

As described further below with reference to FIG. 10, access points 110 and/or electronic devices 112 may include subsystems, such as a networking subsystem, a memory subsystem and a processor subsystem. In addition, access points 110 and electronic devices 112 may include radios 116 in the networking subsystems (which may include at least some of the functionality in an access-point module). More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 116 are shown in access points 110 and electronic devices 112, one or more of these instances may be different from the other instances of radios 116.

As can be seen in FIG. 1, wireless signals 118 (represented by a jagged line) are transmitted from radio 116-1 in access point 110-1. These wireless signals may be received by radio 116-3 in electronic device 112-1. In particular, access point 110-1 may transmit frames or packets. In turn, these frames or packets may be received by electronic device 112-1. Moreover, access point 110-1 may allow electronic device 112-1 to communicate with other electronic devices, computers and/or servers via network 114.

Note that the communication among access points 110 and/or with electronic devices 112 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments, processing a packet or frame in access points 110 and electronic devices 112 includes: receiving wireless signals 118 with the packet or frame; decoding/extracting the packet or frame from received wireless signals 118 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, a given one of access points 110 (such as access point 110-1) or a given one of electronic devices 112 (such as electronic device 112-1) may perform the communication technique. Using access point 110-1 as an illustration, as described further below with reference to FIGS. 2 and 3, access point 110-1 may dynamically adapt RTS-CTS protection to selectively reduce collisions without incurring extra or unnecessary overhead in a WLAN 120 that includes access point 110-1 and one or more of electronic devices 112. (Note that electronic devices 112 are sometimes referred to as 'clients' or 'stations' in WLAN 120.) Notably, access point 110-1 may obtain (e.g., measure, calculate and/or access in memory) communication parameters associated with communication in WLAN 120. For example, the communication parameters may include a collision probability, a PPDU airtime, an RTS airtime, a SIFS airtime and/or a CTS airtime.

Based at least in part on the communication parameters, access point 110-1 may determine an RTS-CTS performance metric. For example, the RTS-CTS performance metric may be based at least in part on the collision probability, the RTS airtime, the SIFS airtime, and/or the CTS airtime. Note that access point 110-1 may know or have access to values of the RTS airtime, the SIFS airtime, and/or the CTS airtime, and may calculate or look-up (e.g., in a look-up table) premeasured or predetermined values of the collision parameter. Moreover, access point 110-1 may estimate or calculate the RTS-CTS performance metric. Alternatively, access point 110-1 may determine the RTS-CTS performance metric using a look-up table with predetermined values of the RTS-CTS performance metric.

Then, access point 110-1 may compare the RTS-CTS performance metric and the PPDU airtime (which may be measured, calculated or look-up by access point 110-1). Moreover, based at least in part on the comparison, access point 110-1 may selectively use RTS-CTS protection during communication of a PPDU with, e.g., electronic device 112-1. For example, if the PPDU airtime is greater than or equal to the RTS-CTS performance metric, access point 110-1 may use the RTS-CTS protection during the communication of the PPDU with electronic device 112-1. Alternatively, if the PPDU airtime is less than the RTS-CTS performance metric, access point 110-1 may not use the RTS-CTS protection during the communication of the PPDU with electronic device 112-1.

Figure 2:
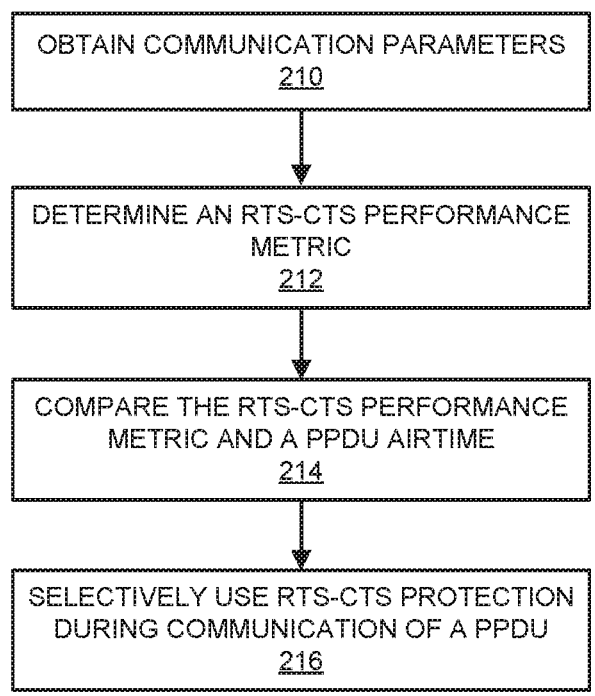
FIG. 2 is a flow diagram illustrating an example method for dynamically adjusting RTS-CTS protection in the system in FIG. 1 in accordance with an embodiment of the present disclosure.

Alternatively, using electronic device 112-1 as an illustration, as described further below with reference to FIGS. 2 and 3, electronic device 112-1 may dynamically adapt RTS-CTS protection to selectively reduce collisions without incurring extra or unnecessary overhead in WLAN 120. Notably, electronic device 112-1 may obtain (e.g., measure, calculate or obtain from access point 110-1) communication parameters associated with communication in WLAN 120. For example, the communication parameters may include a collision probability, a PPDU airtime, an RTS airtime, a SIFS airtime and/or a CTS airtime.

Based at least in part on the communication parameters, electronic device 112-1 may determine an RTS-CTS performance metric. For example, the RTS-CTS performance metric may be based at least in part on the collision probability, the RTS airtime, the SIFS airtime, and/or the CTS airtime. Note that electronic device 112-1 may know or have access to values of the RTS airtime, the SIFS airtime, and/or the CTS airtime, and may estimate or look-up (e.g., in a look-up table) predetermined estimates of the collision parameter. Moreover, electronic device 112-1 may estimate or calculate the RTS-CTS performance metric. Alternatively, electronic device 112-1 may determine the RTS-CTS performance metric using a look-up table with predetermined values of the RTS-CTS performance metric.

Then, electronic device 112-1 may compare the RTS-CTS performance metric and the PPDU airtime (which may be measured, calculated or look-up by electronic device 112-1). Moreover, based at least in part on the comparison, electronic device 112-1 may selectively use the RTS-CTS protection during communication of a PPDU with, e.g., access point 110-1. For example, if the PPDU airtime is greater than or equal to the RTS-CTS performance metric, electronic device 112-1 may use the RTS-CTS protection during the communication of the PPDU with access point 110-1. Alternatively, if the PPDU airtime is less than the RTS-CTS performance metric, electronic device 112-1 may not use the RTS-CTS protection during the communication of the PPDU with access point 110-1.

In this way, the communication technique may allow access points 110 and/or electronic devices 112 to selectively use the RTS-CTS protection during communication in WLAN 120. Consequently, the communication technique may provide improved communication performance without unnecessary overhead. Therefore, the communication technique may improve the communication performance of access points 110 and/or electronic devices 112, and may facilitate an improved user experience when communicating information using access points 110 and electronic devices 112.

We now describe embodiments of the method. FIG. 2 presents a flow diagram illustrating an example of a method 200 for dynamically adjusting RTS-CTS protection, which may be performed by an electronic device, such as one of access points 110 or one of electronic devices 112 in FIG. 1. During operation, the electronic device may obtain communication parameters (operation 210) associated with communication in a WLAN, which includes the electronic device and the second electronic device. For example, the communication parameters may include a collision probability, a PPDU airtime, an RTS airtime, a SIFS airtime and/or a CTS airtime.

Then, the electronic device may determine an RTS-CTS performance metric (operation 212) based at least in part on the communication parameters. For example, the RTS-CTS performance metric may be based at least in part on the collision probability, the RTS airtime, the SIFS airtime, and/or the CTS airtime.

Next, the electronic device may compare the RTS-CTS performance metric and the PPDU airtime (operation 214). Moreover, based at least in part on the comparison (operation 214), the electronic device may selectively use the RTS-CTS protection (operation 216) during communication of a PPDU (such as in a frame or a packet) with the second electronic device. For example, if the PPDU airtime is greater than or equal to the RTS-CTS performance metric, the electronic device may use or enable the RTS-CTS protection during the communication of the PPDU with the second electronic device. Alternatively, if the PPDU airtime is less than the RTS-CTS performance metric, the electronic device may not use or enable the RTS-CTS protection during the communication of the PPDU with the second electronic device.

Moreover, the electronic device may estimate the collision probability indirectly. For example, the collision probability may be computed based at least in part on a number of electronic devices contending for a shared medium in the WLAN, a type of traffic, traffic flows and/or a communication direction. Alternatively, the electronic device may determine the collision probability using a look-up table that includes predetermined or precalculated collision probabilities.

In some embodiments, the electronic device is an access point. The access point may compute or look-up the collision probability based at least in part on: a number of electronic devices that are associated with the access point, how many of the associated electronic devices have active traffic flows to be sent in a downlink communication direction, a traffic type and/or a number of traffic flows in the downlink and uplink communication directions during a time interval. For example, the access point may monitor the number of traffic flows.

Alternatively, the electronic device may be a client in the WLAN. In these embodiments, the electronic device may estimate the collision probability based at least in part on a number of RTS and/or acknowledgment timeouts and a number of transmission attempts by the electronic device.

Figure 3:
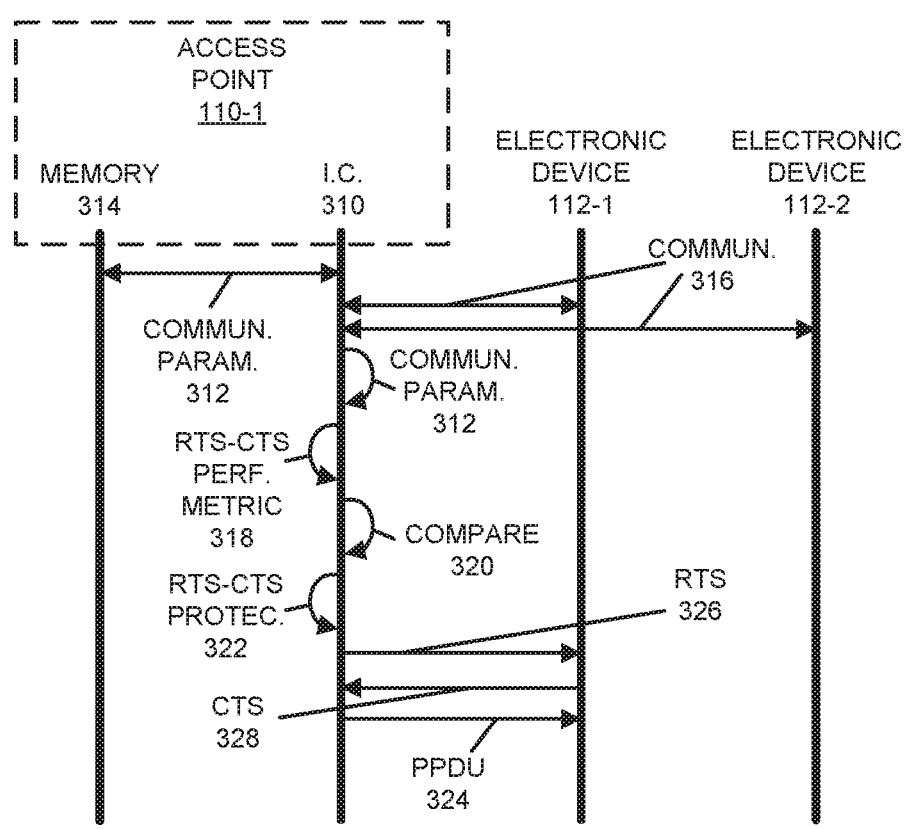
FIG. 3 is a drawing illustrating an example of communication among electronic devices in FIG. 1 in accordance with an embodiment of the present disclosure.

Embodiments of the communication technique are further illustrated in FIG. 3, which presents a drawing illustrating communication among access point 110-1 and electronic devices 112. Note that electronic devices 112 may be communicatively attached or connected to access point 110-1. For example, electronic devices 112 may be associated with access point 110-1. In the discussion of FIG. 3, as an illustration, the communication technique is performed by access point 110-1.

During the communication technique, interface circuit (I.C.) 310 in access point 110-1 may access stored communication parameters 312 in memory 314 in access point 110-1 and/or may measure communication parameters 312 based at least in part on communication 316 with electronic devices 112 (such as communication of one or more packets or frames, and subsequent acknowledgments).

Then, interface circuit 310 may determine an RTS-CTS performance metric 318 based at least in part on communication parameters 312.

Next, interface circuit 310 may compare 320 RTS-CTS performance metric 318 and a PPDU airtime. Moreover, based at least in part on comparison 320, interface circuit 310 may selectively use RTS-CTS protection 322 during communication of a PPDU 324 with electronic device 112-1. For example, if the PPDU airtime is greater than or equal to RTS-CTS performance metric 318, interface circuit 310 may transmit RTS 326, and may wait to receive a CTS 328 from electronic device 112-1 before transmitting PPDU 324 to electronic device 112-1. Alternatively, if the PPDU airtime is less than RTS-CTS performance metric 318, interface circuit 310 may not use RTS-CTS protection 322 during the communication of PPDU 324 with electronic device 112-1.

While FIG. 3 illustrates particular operations involving unilateral or bilateral communication, in general each of the operations illustrated in FIG. 3 may involve unilateral or bilateral communication.

We now describe embodiments of the communication technique. In order to estimate the average airtime for a PPDU transmission, in some embodiments of the communication technique the PPDU airtime, collision probability and RTS-CTS airtime overhead may be needed. Moreover, in order to simplify the analysis, assume that there are no hidden nodes in the WLAN. Note that in the presence of hidden nodes, it can be very difficult to estimate the collision probability. Consequently, in this case, RTS-CTS protection may be used. In some embodiments of the disclosed communication technique, RTS-CTS usage is adapted in a WLAN with no hidden nodes. Furthermore, it is also assumed that, in the event of a collision, there is no collision for an immediate PPDU re-transmission attempt. Because the contention window doubles in the event of a collision, the probability of a back-to-back collision is small, so it is not unreasonable to ignore such a subsequent collision.

Figure 4:
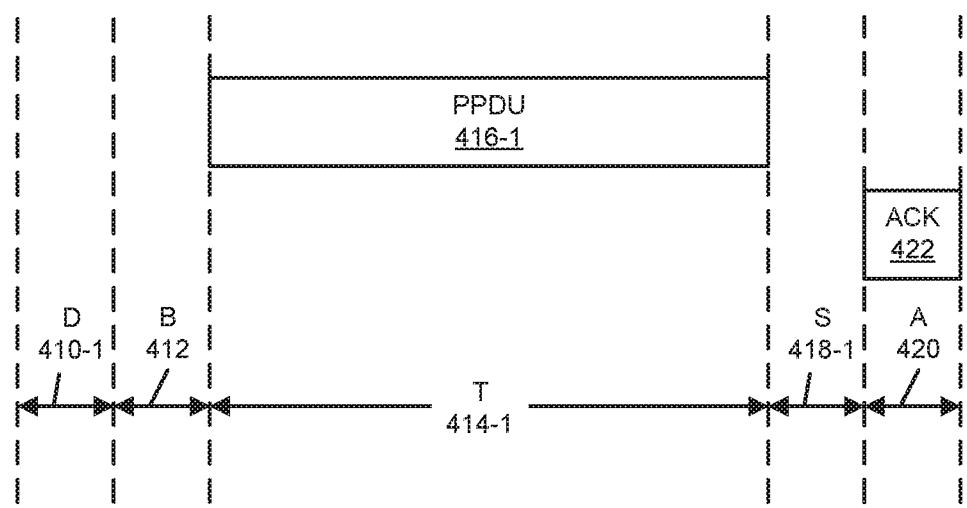
FIG. 4 is a drawing illustrating an example of a physical layer convergence protocol (PLCP) protocol data unit (PPDU) transmission sequence without ready to send (RTS)-clear to send (CTS) protection and with no collision in accordance with an embodiment of the present disclosure.

FIG. 4 presents an example of a PPDU transmission sequence without RTS-CTS protection and with no collision. In FIG. 4, D 410-1 is the arbitration interframe space (AIFS) airtime, B 412 is the average random backoff time, T 414-1 is the PPDU 416-1 airtime, S 418-1 is the short interframe space (SIFS) time, and A 420 is an acknowledgment 422 (ACK)/block ACK airtime.

Figure 5:
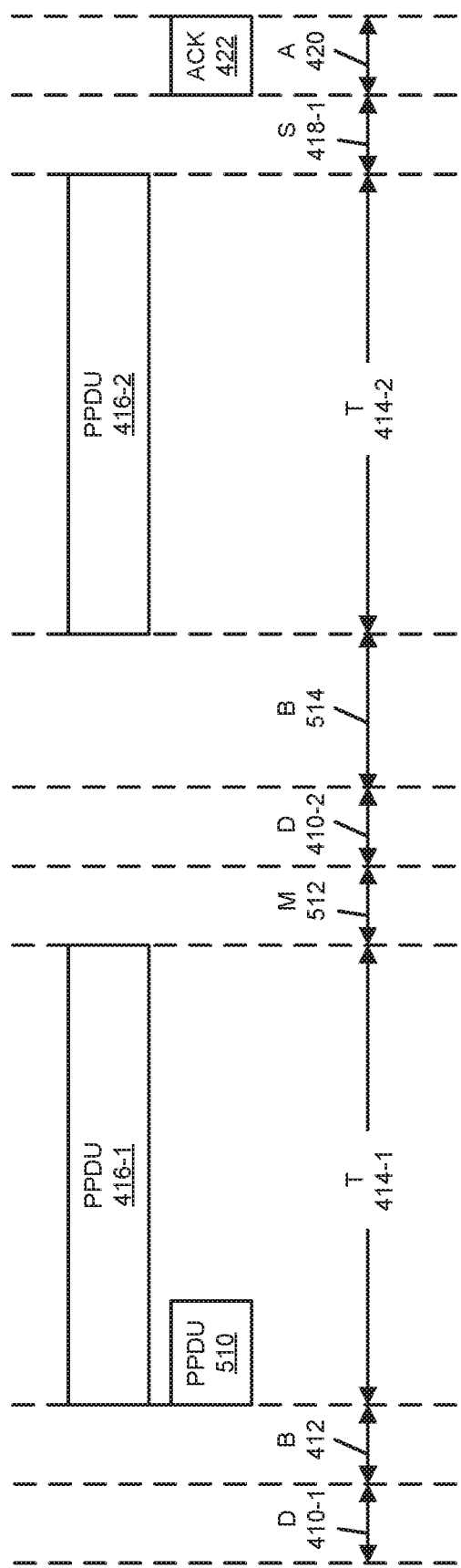
FIG. 5 is a drawing illustrating an example of a PPDU transmission sequence without RTS-CTS protection in the event of a collision between PPDUs in accordance with an embodiment of the present disclosure.

Moreover, FIG. 5 presents an example of a PPDU transmission sequence without RTS-CTS protection in the event of a collision between PPDU 416-1 and 510. In FIG. 5, M 512 is the CTS/ACK timeout, B 514 is twice the average random backoff time.

Figure 6:
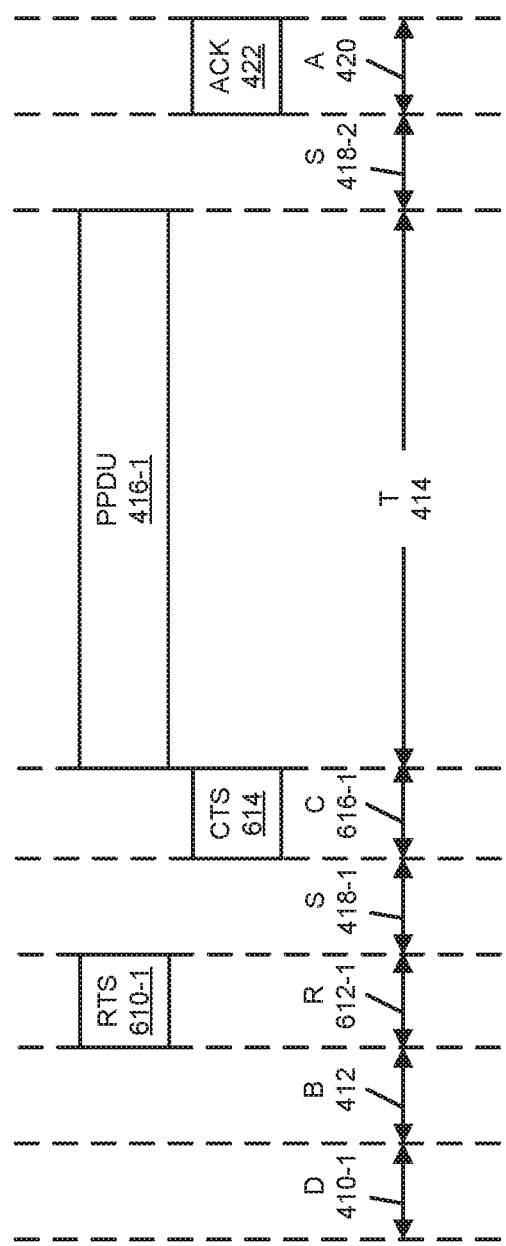
FIG. 6 is a drawing illustrating an example of a PPDU transmission sequence with RTS-CTS protection and no collision in accordance with an embodiment of the present disclosure.

Furthermore, FIG. 6 presents an example of a PPDU transmission sequence with RTS-CTS protection using RTS 610-1 and CTS 614 and no collision. In FIG. 6, R 612-1 is the RTS airtime and C 616-1 is the CTS airtime.

Figure 7:
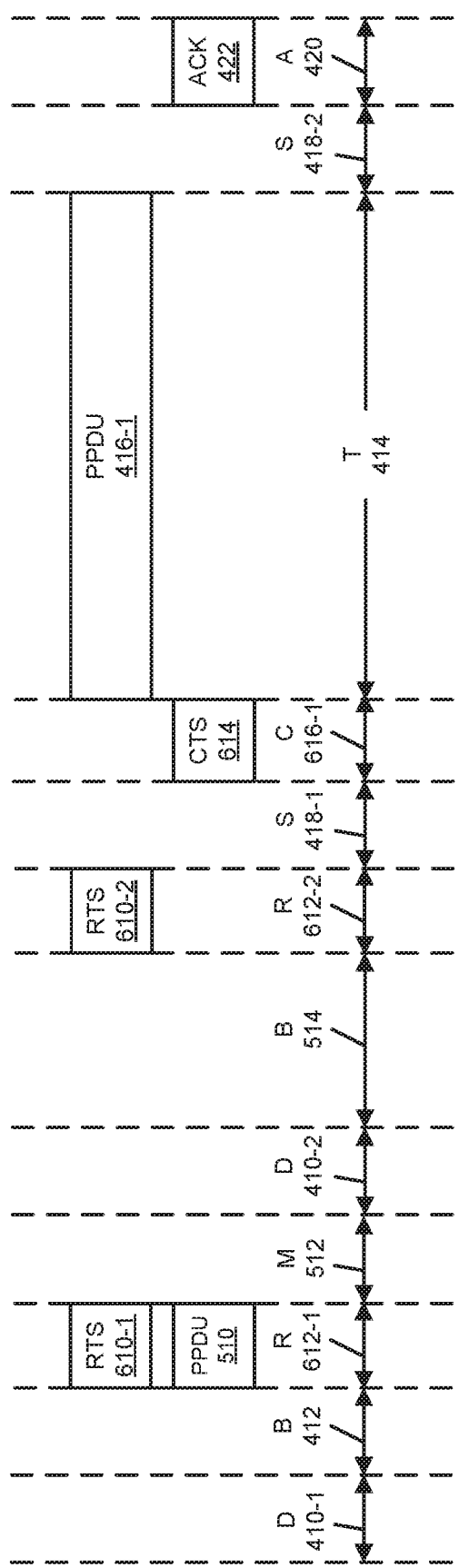
FIG. 7 is a drawing illustrating an example of a PPDU transmission sequence with RTS-CTS protection in the event of a collision between RTS and a PPDU in accordance with an embodiment of the present disclosure.

Additionally, FIG. 7 presents an example of a PPDU transmission sequence with RTS-CTS protection in the event of collision between RTS 610-2 and PPDU 510.

In the following discussion, let p be the collision probability. In FIGS. 4 and 5, the average airtime to send a PPDU without RTS-CTS protection is $$T_n = p \cdot (D+B+T+M+D+2 \cdot B+T+S+A) + (1-p) \cdot (D+B+T+S+A),$$

$$T_n = p \cdot D + 2 \cdot p \cdot B + p \cdot T + p \cdot M + D + B + T + S + A, \text{ or}$$

$$T_n = p \cdot (D+2 \cdot B+T+M) + D+B+T+S+A. \quad (1)$$

Moreover, in FIGS. 6 and 7, the average airtime to send a PPDU with RTS-CTS protection is $$T_r = p \cdot (D+B+R+M+D+2 \cdot B+R+2 \cdot S+C+T+S+A) + (1-p) \cdot (D+B+2 \cdot S+C+T+S+A),$$

$$T_r = p \cdot D + 2 \cdot p \cdot B + p \cdot R + p \cdot M + D + B + R + 2 \cdot S + C + T + S + A, \text{ or}$$

$$T_r = p \cdot (D+2 \cdot B+R+M) + D+B+R+3 \cdot S+C+T+A. \quad (2)$$

Therefore, $$T_n - T_r = p \cdot (D+2 \cdot B+T+M) + D+B+T+S+A - p \cdot (D+2 \cdot B+R+M) - D-B-R-3-S-C-T-A, \text{ or}$$

$$T_n - T_r = p \cdot (T-R) - (R+2 \cdot S+C). \quad (3)$$

If $T_n - T_r$ is greater than or equal to zero, then the RTS-CTS protection may require less average airtime per PPDU and, this, it may be beneficial to enable RTS-CTS protection. This condition can be re-expressed as $$T \geq R + \frac{(R + 2 \cdot S + C)}{p}. \quad (4)$$

Figure 8:
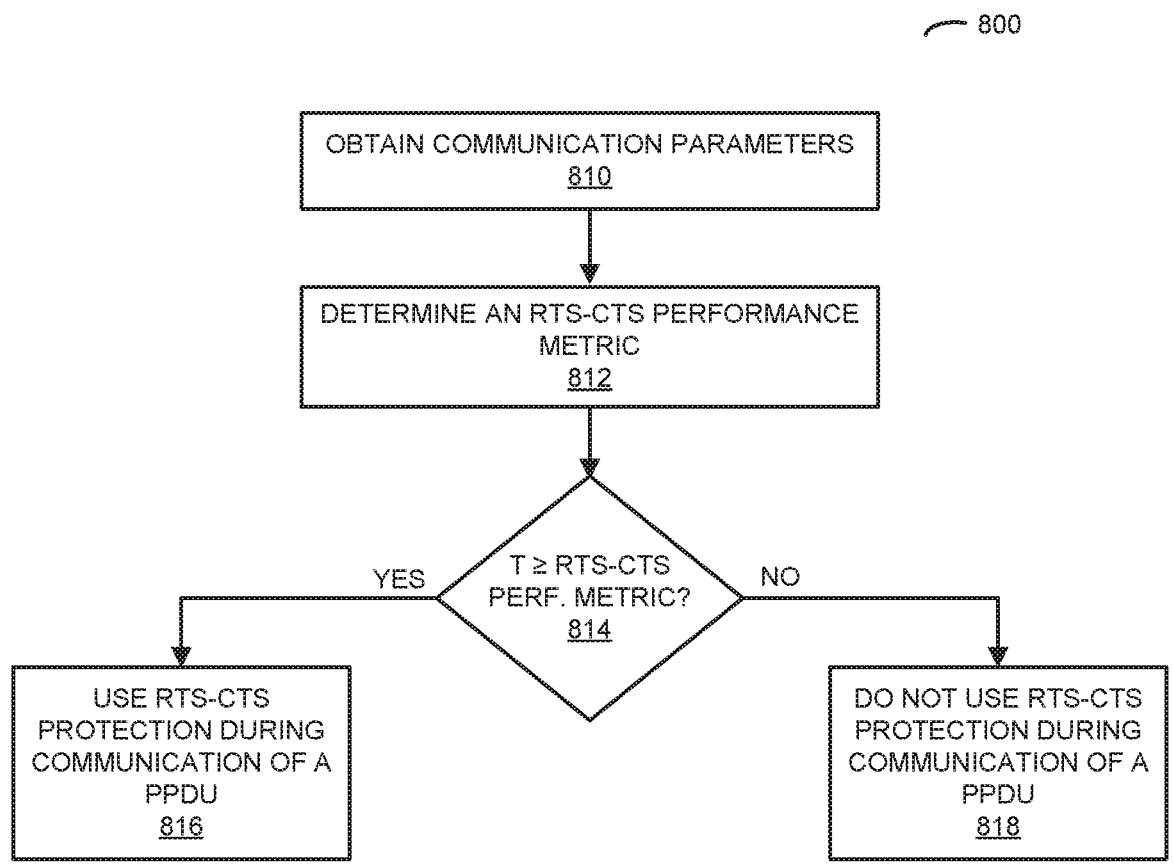
FIG. 8 is a flow diagram illustrating an example method for dynamically adjusting RTS-CTS protection in the system in FIG. 1 in accordance with an embodiment of the present disclosure.

FIG. 8 presents an example of a method 800 for dynamically adapting RTS-CTS protection, which may be performed by an electronic device (such as one of access points 110 or one of electronic devices 112 in FIG. 1). In FIG. 8, the PPDU airtime, the RTS airtime, the SIFS airtime and the CTS airtime may be known quantities to the electronic device that is transmitting a PPDU. The PPDU airtime may be calculated given the payload size (e.g., in Bytes), the physical data rate selected for the transmission, and the packet type (such as legacy, high throughput or HT, very high throughput or VHT, high efficiency or HE, etc.), which may be provided in a given IEEE 802.11 standard.

During operation, the electronic device may obtain communication parameters (operation 810). For example, the communication parameters may include the collision probability, the PPDU airtime, the RTS airtime, the SIFS airtime and the CTS airtime.

Then, the electronic device may determine an RTS-CTS performance metric (operation 812) based at least in part on the communication parameters. For example, the RTS-CTS performance metric may be based at least in part on the collision probability, the RTS airtime, the SIFS airtime, and the CTS airtime.

Next, based at least in part on the RTS-CTS performance metric and the PPDU airtime, the electronic device may selectively use the RTS-CTS protection during communication of a PPDU with a second electronic device. Notably, the electronic device may compare the RTS-CTS performance metric with the PPDU airtime (operation 814). If the PPDU airtime is greater than or equal to the RTS-CTS performance metric (operation 814), the electronic device may use the RTS-CTS protection (operation 816) during the communication of the PPDU with the second electronic device. Alternatively, if the PPDU airtime is less than the RTS-CTS performance metric (operation 814), the electronic device does not use the RTS-CTS protection (operation 818) during the communication of the PPDU with the second electronic device.

Note that the collision probability may not be directly available to the electronic device. Instead, the electronic device may estimate the collision probability indirectly. For example, the collision probability may depend on a number of electronic devices contending for the shared medium, a type of traffic (such as a user datagram protocol or UDP, or a transmission control protocol or TCP), traffic flows and/or a direction (such as downlink, uplink or bidirectional communication). In some embodiments, the electronic device may calculate the collision probability. Alternatively, the electronic device may determine the collision probability using a look-up table of predetermined or precalculated collision probabilities as a function of the aforementioned parameters or factors.

If the electronic device is an access point, then it may have access to or knowledge about the number of associated electronic devices (or clients) that are connected with the access point. Moreover, the access point may also know how many of the associated electronic devices have active traffic to be sent in the downlink direction and the traffic type (such as UDP or TCP). Furthermore, the access point may monitor the number of flows in the downlink and uplink directions during a time interval (such as, e.g., the preceding 30 s). Based at least in part on this information, the collision probability can be estimated (e.g., computed or looked up).

In some embodiments of methods 200 (FIG. 2) and/or 800, there may be additional or fewer operations. Moreover, there may be one or more different operations. Furthermore, the order of the operations may be changed, and/or two or more operations may be combined into a single operation.

Figure 9:
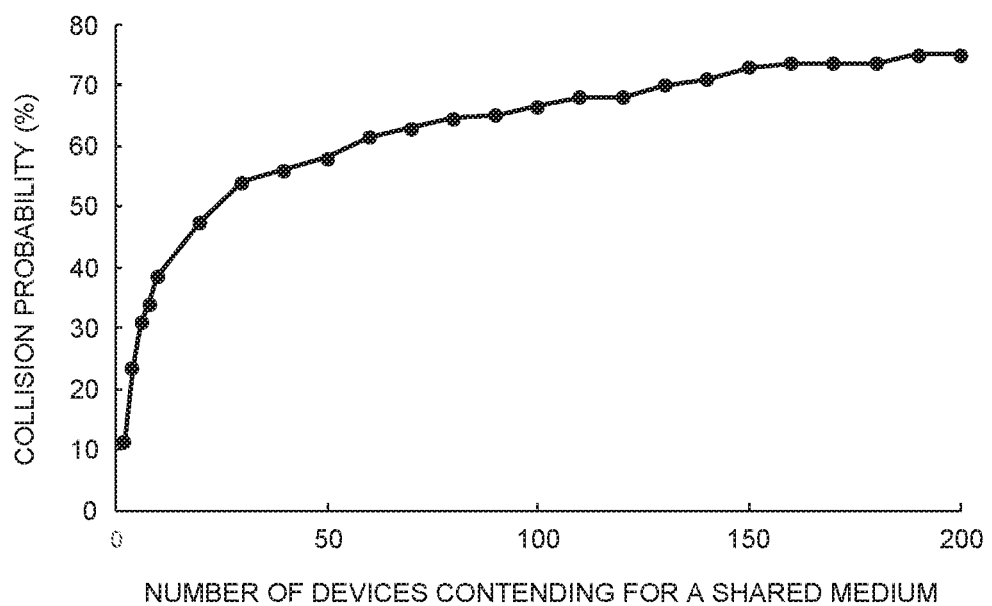
FIG. 9 is a drawing of simulated collision probability as a function of a number of contending electronic devices for a shared medium in the system in FIG. 1 in accordance with an embodiment of the present disclosure.

FIG. 9 presents an example of a drawing of simulated collision probability as a function of a number of contending electronic devices for a shared medium. For example, if there are 60 electronic devices associated with or connected to an access point, and if there is active bidirectional UDP or TCP traffic with nine electronic devices, then there are a total of ten devices (nine electronic devices and one access point) contending for the shared medium. Using FIG. 6, the simulated collision probability is approximately 62%. Similarly, when there is only TCP downlink traffic, a simulation can be performed to determine the collision probability as experienced by the electronic devices that are associated with or connected to the access point. In this case, a fraction of these electronic devices will have TCP acknowledgment packets to transmit at any given time.

If an electronic device that is transmitting PPDUs is a client, then it may not know the number of electronic devices that are associated with or connected to the same access point on the same channel. In this case, the collision probability may be estimated by keeping count of the number of RTS/ACK timeouts and the number of transmission attempts by the electronic device. The fraction of RTS/ACK timeouts to the number of transmission attempts may be an approximate estimate of the collision probability.

In some embodiments, the collision probability may be 0.2 and the SIFS airtime may be 16 μs. If the RTS rate is 6 Mbps, then the RTS airtime may be 48 μs. Moreover, the CTS airtime may be 40 μs. Moreover, if $T_{thr}$ denotes the PPDU airtime threshold at or above which RTS may be enabled, then $$T_{Thr} = R + \frac{(R + 2 \cdot S + C)}{p} = 48 + \frac{(48 + 32 + 40)}{0.2} = 648 \ \mu s.$$

We now describe embodiments of an electronic device, which may perform at least some of the operations in the communication technique. For example, the electronic device may include one of access points 110 or electronic devices 112 in FIG. 1. FIG. 10 presents a block diagram illustrating an electronic device 1000 in accordance with some embodiments. This electronic device includes processing subsystem 1010, memory subsystem 1012, and networking subsystem 1014. Processing subsystem 1010 includes one or more devices configured to perform computational operations. For example, processing subsystem 1010 can include one or more microprocessors, ASICs, microcontrollers, programmable-logic devices, graphics processing units (GPUs) and/or one or more digital signal processors (DSPs).

Memory subsystem 1012 includes one or more devices for storing data and/or instructions for processing subsystem 1010 and networking subsystem 1014. For example, memory subsystem 1012 can include dynamic random access memory (DRAM), static random access memory (SRAM), and/or other types of memory. In some embodiments, instructions for processing subsystem 1010 in memory subsystem 1012 include: one or more program modules or sets of instructions (such as program instructions 1022 or operating system 1024), which may be executed by processing subsystem 1010. Note that the one or more computer programs may constitute a computer-program mechanism. Moreover, instructions in the various modules in memory subsystem 1012 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1010.

In addition, memory subsystem 1012 can include mechanisms for controlling access to the memory. In some embodiments, memory subsystem 1012 includes a memory hierarchy that comprises one or more caches coupled to a memory in electronic device 1000. In some of these embodiments, one or more of the caches is located in processing subsystem 1010.

In some embodiments, memory subsystem 1012 is coupled to one or more high-capacity mass-storage devices (not shown). For example, memory subsystem 1012 can be coupled to a magnetic or optical drive, a solid-state drive, or another type of mass-storage device. In these embodiments, memory subsystem 1012 can be used by electronic device 1000 as fast-access storage for often-used data, while the mass-storage device is used to store less frequently used data.

Networking subsystem 1014 includes one or more devices configured to couple to and communicate on a wired and/or wireless network (i.e., to perform network operations), including: control logic 1016, an interface circuit 1018 and one or more antennas 1020 (or antenna elements). (While FIG. 10 includes one or more antennas 1020, in some embodiments electronic device 1000 includes one or more nodes, such as nodes 1008, e.g., a pad, which can be coupled to the one or more antennas 1020. Thus, electronic device 1000 may or may not include the one or more antennas 1020. Note that nodes 1008 may include one or more input nodes and/or one or more output nodes.) For example, networking subsystem 1014 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 1014 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1000 may use the mechanisms in networking subsystem 1014 for performing simple wireless communication between the electronic devices, e.g., transmitting advertising or beacon frames and/or scanning for advertising frames transmitted by other electronic devices as described previously.

Within electronic device 1000, processing subsystem 1010, memory subsystem 1012, and networking subsystem 1014 are coupled together using bus 1028. Bus 1028 may include an electrical, optical, and/or electro-optical connection that the subsystems can use to communicate commands and data among one another. Although only one bus 1028 is shown for clarity, different embodiments can include a different number or configuration of electrical, optical, and/or electro-optical connections among the subsystems.

In some embodiments, electronic device 1000 includes a display subsystem 1026 for displaying information on a display, which may include a display driver and the display, such as a liquid-crystal display, a multi-touch touchscreen, etc.

Electronic device 1000 can be (or can be included in) any electronic device with at least one network interface. For example, electronic device 1000 can be (or can be included in): a desktop computer, a laptop computer, a subnotebook/netbook, a server, a tablet computer, a smartphone, a cellular telephone, a smartwatch, a consumer-electronic device, a portable computing device, a wearable device, an access point, a transceiver, an eNodeB, a router, a switch, communication equipment, a controller, test equipment, and/or another electronic device.

Although specific components are used to describe electronic device 1000, in alternative embodiments, different components and/or subsystems may be present in electronic device 1000. For example, electronic device 1000 may include one or more additional processing subsystems, memory subsystems, networking subsystems, and/or display subsystems. Additionally, one or more of the subsystems may not be present in electronic device 1000. Moreover, in some embodiments, electronic device 1000 may include one or more additional subsystems that are not shown in FIG. 10. Also, although separate subsystems are shown in FIG. 10, in some embodiments some or all of a given subsystem or component can be integrated into one or more of the other subsystems or component(s) in electronic device 1000. For example, in some embodiments program instructions 1022 are included in operating system 1024 and/or control logic 1016 is included in interface circuit 1018.

Moreover, the circuits and components in electronic device 1000 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1014. The integrated circuit may include hardware and/or software mechanisms that are used for transmitting wireless signals from electronic device 1000 and receiving signals at electronic device 1000 from other electronic devices. Aside from the mechanisms herein described, radios are generally known in the art and hence are not described in detail. In general, networking subsystem 1014 and/or the integrated circuit can include any number of radios. Note that the radios in multiple-radio embodiments function in a similar way to the described single-radio embodiments.

In some embodiments, networking subsystem 1014 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an LTE communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 1022, operating system 1024 (such as a driver for interface circuit 1018) or in firmware in interface circuit 1018. Alternatively or additionally, at least some of the operations in the communication technique may be implemented in a physical layer, such as hardware in interface circuit 1018.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

While the preceding discussion illustrated the communication techniques using communication in one or more particular bands of frequencies, one or more other bands of frequencies may be used, such as bands of frequencies corresponding to LTE and/or Citizens Broadband Radio Service (CBRS). For example, the bands of frequencies may include: a band of frequencies between 3.55 and 3.7 GHz, a band of frequencies near or including 2.4 GHz, a band of frequencies near or including 3.6 GHz, a band of frequencies near or including 4.9 GHz, a band of frequencies near or including 5 GHz, a band of frequencies near or including 5.9 GHz or 6 GHz, a band of frequencies near 60 GHz and/or another band of frequencies. Note that the bands of frequencies may include one or more bands of frequencies.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
    an antenna; and
    an interface circuit, coupled to the antenna, configured to wirelessly communicate with a second electronic device, wherein the electronic device is configured to perform operations comprising:
        obtaining communication parameters associated with communication in a wireless local area network (WLAN), which includes the electronic device and the second electronic device;
        determining a ready to send (RTS)-clear to send (CTS) performance metric based at least in part on the communication parameters;
        comparing the RTS-CTS performance metric and a physical layer convergence protocol (PLCP) protocol data unit (PPDU) airtime; and
        selectively using, based at least in part on the comparison, RTS-CTS protection during communication of a PPDU with the second electronic device, wherein the selective using of the RTS-CTS protection comprises:
when the PPDU airtime is greater than or equal to the RTS-CTS performance metric, the electronic device uses the RTS-CTS protection during the communication of the PPDU with the second electronic device; and
when the PPDU airtime is less than the RTS-CTS performance metric, the electronic device does not use the RTS-CTS protection during the communication of the PPDU with the second electronic device.

2. The electronic device of claim 1, wherein the communication parameters comprise: a collision probability, the PPDU airtime, an RTS airtime, a short interframe space (SIFS) airtime and a CTS airtime.

3. The electronic device of claim 1, wherein the RTS-CTS performance metric is based at least in part on: a collision probability, an RTS airtime, a short interframe space (SIFS) airtime, and a CTS airtime.

4. The electronic device of claim 1, wherein the obtaining of the communication parameters comprises computing a collision probability based at least in part on a number of electronic devices contending for a shared medium in the WLAN, a type of traffic, traffic flows and a communication direction.

5. The electronic device of claim 1, wherein the obtaining of the communication parameters comprises determining a collision probability using a look-up table that comprises predetermined or precalculated collision probabilities.

6. The electronic device of claim 1, wherein the electronic device comprises an access point; and
wherein the obtaining of the communication parameters comprises computing a collision probability based at least in part on: a number of electronic devices that are associated with the access point, how many of the associated electronic devices have active traffic flows to be sent in a downlink communication direction, a traffic type and a number of traffic flows in the downlink and uplink communication directions during a time interval.

7. The electronic device of claim 1, wherein the electronic device comprises a client in the WLAN; and
wherein the obtaining of the communication parameters comprises estimating a collision probability based at least in part on a number of RTS and acknowledgment timeouts, and a number of transmission attempts by the electronic device.

8. A non-transitory computer-readable storage medium for use in conjunction with an electronic device, the computer-readable storage medium storing program instructions, wherein, when executed by the electronic device, the program instructions cause the electronic device to perform operations comprising:
obtaining communication parameters associated with communication in a wireless local area network (WLAN), which includes the electronic device and the second electronic device;
determining a ready to send (RTS)-clear to send (CTS) performance metric based at least in part on the communication parameters;
comparing the RTS-CTS performance metric and a physical layer convergence protocol (PLCP) protocol data unit (PPDU) airtime; and
selectively using, based at least in part on the comparison, RTS-CTS protection during communication of a PPDU with the second electronic device, wherein the selective using of the RTS-CTS protection comprises:
when the PPDU airtime is greater than or equal to the RTS-CTS performance metric, the electronic device uses the RTS-CTS protection during the communication of the PPDU with the second electronic device; and
when the PPDU airtime is less than the RTS-CTS performance metric, the electronic device does not use the RTS-CTS protection during the communication of the PPDU with the second electronic device.

9. The non-transitory computer-readable storage medium of claim 8, wherein the communication parameters comprise: a collision probability, the PPDU airtime, an RTS airtime, a short interframe space (SIFS) airtime and a CTS airtime.

10. The non-transitory computer-readable storage medium of claim 8, wherein the RTS-CTS performance metric is based at least in part on: a collision probability, an RTS airtime, a short interframe space (SIFS) airtime, and a CTS airtime.

11. The non-transitory computer-readable storage medium of claim 8, wherein the obtaining of the communication parameters comprises computing a collision probability based at least in part on a number of electronic devices contending for a shared medium in the WLAN, a type of traffic, traffic flows and a communication direction.

12. The non-transitory computer-readable storage medium of claim 8, wherein the obtaining of the communication parameters comprises determining a collision probability using a look-up table that comprises predetermined or precalculated collision probabilities.

13. The non-transitory computer-readable storage medium of claim 8, wherein the electronic device comprises an access point; and
wherein the obtaining of the communication parameters comprises computing a collision probability based at least in part on: a number of electronic devices that are associated with the access point, how many of the associated electronic devices have active traffic flows to be sent in a downlink communication direction, a traffic type and a number of traffic flows in the downlink and uplink communication directions during a time interval.

14. The non-transitory computer-readable storage medium of claim 8, wherein the electronic device comprises a client in the WLAN; and
wherein the obtaining of the communication parameters comprises estimating a collision probability based at least in part on a number of RTS and acknowledgment timeouts, and a number of transmission attempts by the electronic device.

15. A method for dynamically adapting RTS-CTS protection, comprising:
by an electronic device:
obtaining communication parameters associated with communication in a wireless local area network (WLAN), which includes the electronic device and the second electronic device;
determining a ready to send (RTS)-clear to send (CTS) performance metric based at least in part on the communication parameters;
comparing the RTS-CTS performance metric and a physical layer convergence protocol (PLCP) protocol data unit (PPDU) airtime; and
selectively using, based at least in part on the comparison, RTS-CTS protection during communication of a PPDU with the second electronic device, wherein the selective using of the RTS-CTS protection comprises:

when the PPDU airtime is greater than or equal to the RTS-CTS performance metric, the electronic device uses the RTS-CTS protection during the communication of the PPDU with the second electronic device; and when the PPDU airtime is less than the RTS-CTS performance metric, the electronic device does not use the RTS-CTS protection during the communication of the PPDU with the second electronic device.

16. The method of claim 15, wherein the communication parameters comprise: a collision probability, the PPDU airtime, an RTS airtime, a short interframe space (SIFS) airtime and a CTS airtime.

17. The method of claim 15, wherein the RTS-CTS performance metric is based at least in part on: a collision probability, an RTS airtime, a short interframe space (SIFS) airtime, and a CTS airtime.

18. The method of claim 15, wherein the obtaining of the communication parameters comprises computing a collision probability based at least in part on a number of electronic devices contending for a shared medium in the WLAN, a type of traffic, traffic flows and a communication direction.

19. The method of claim 15, wherein the obtaining of the communication parameters comprises determining a collision probability using a look-up table that comprises predetermined or precalculated collision probabilities.

20. The method of claim 15, wherein, when the electronic device comprises an access point, the obtaining of the communication parameters comprises computing a collision probability based at least in part on: a number of electronic devices that are associated with the access point, how many of the associated electronic devices have active traffic flows to be sent in a downlink communication direction, a traffic type and a number of traffic flows in the downlink and uplink communication directions during a time interval; and wherein, when the electronic device comprises a client in the WLAN, the obtaining of the communication parameters comprises estimating a collision probability based at least in part on a number of RTS and acknowledgment timeouts, and a number of transmission attempts by the electronic device.

* * * * *